United States Patent
Trevino et al.

(10) Patent No.: US 6,563,540 B2
(45) Date of Patent: May 13, 2003

(54) LIGHT SENSOR WITH INCREASED DYNAMIC RANGE

(75) Inventors: Roy T. Trevino, Chandler, AZ (US); Dung C. Nguyen, Scottsdale, AZ (US); E. Ray Hirt, Mesa, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/259,738

(22) Filed: Feb. 26, 1999

(65) Prior Publication Data

US 2002/0012056 A1 Jan. 31, 2002

(51) Int. Cl.$^7$ .................... H04N 5/335; H01L 31/062
(52) U.S. Cl. .................... 348/302; 348/308; 257/291
(58) Field of Search ................ 348/302, 308, 348/311; 257/222, 231, 291, 292

(56) References Cited

U.S. PATENT DOCUMENTS

| | | | |
|---|---|---|---|
| 5,105,277 A | 4/1992 | Hayes et al. | |
| 5,376,811 A | 12/1994 | Ikeda | |
| 5,461,425 A | * 10/1995 | Fowler et al. | 348/311 |
| 5,471,515 A | * 11/1995 | Fossum et al. | 257/292 |
| 5,572,256 A | 11/1996 | Egawa et al. | 348/296 |
| 5,576,763 A | 11/1996 | Ackland et al. | |
| 5,631,704 A | 5/1997 | Dickinson et al. | |
| 5,739,562 A | * 4/1998 | Ackland et al. | 257/292 |
| 5,812,703 A | 9/1998 | Juen et al. | |
| 5,861,620 A | * 1/1999 | Takashashi et al. | 348/308 |
| 5,880,460 A | 3/1999 | Merrill | |
| 5,892,541 A | 4/1999 | Merrill | |
| 5,900,623 A | 5/1999 | Tsang et al. | |
| 5,917,547 A | 6/1999 | Merrill et al. | |
| 5,962,844 A | * 10/1999 | Merrill et al. | 348/308 |
| 6,011,251 A | * 1/2000 | Dierickx et al. | 250/208.1 |
| 6,037,979 A | * 3/2000 | Yonemoto | 348/308 |
| 6,118,483 A | 9/2000 | Etoh | |
| 6,201,572 B1 | 3/2001 | Chou | |
| 6,311,895 B1 | * 11/2001 | Olmstead et al. | 235/462.41 |

FOREIGN PATENT DOCUMENTS

| | | | |
|---|---|---|---|
| EP | 0630152 A2 | 12/1994 | |
| EP | 630152 | * 12/1994 | H04N/3/15 |
| EP | 0707 416 A2 | 4/1996 | H04N/3/15 |
| WO | WO9728558 | 7/1997 | |
| WO | WO9819455 | 7/1998 | H04N/3/15 |

OTHER PUBLICATIONS

Nudd et al.; A Charge Coupled Device Image Processor for Smart Sensor Applications; SPIE, vol. 155; pp.15–22, 1978.*

Orly Yadid–Pecht et al., "Method of Operating An Image Sensor With Ultra High Dynamic Range Linear Output", NASA Technical Support Package for Jan. 1997 fronm JPL New Technology Report NPO–19705.

Steve Mann et al., "On Being 'undigital' with digital cameras: Extending Dynamic Range by Combining Differently Exposed Pictures", M.I.T. Media Laboratory Tech Report No. TR–323, pp. 422–428, May 7–11, 1995.

G.R. Nudd et al., "*A Charge–Coupled Device Image Processor For Smart Sensor Applications,*" SPIE, vol. 155, pp. 15–22 (1978).

* cited by examiner

*Primary Examiner*—Wendy R. Garber
*Assistant Examiner*—Luong Nguyen
(74) *Attorney, Agent, or Firm*—Blakely, Sokoloff, Taylor & Zafman LLP

(57) ABSTRACT

In an image capture system having a sensor with a first node and a second node, a method of capturing image data is disclosed. The first node is reset. The second node is reset. An image is collected on the first node. A first pixel value is then transferred from the first node to the second node after a first predetermined time period. The first pixel value and a second pixel value is then provided after a second predetermined time period. An arithmetic operation is performed on the first pixel value and the second pixel value. A system for performing the method is also disclosed.

28 Claims, 8 Drawing Sheets

LIGHT SENSOR WITH INCREASED DYNAMIC RANGE

BACKGROUND OF THE INVENTION

1. Technical Field

The invention relates generally to image capture systems. More specifically, the invention is related to an improved light sensor and a method of employing the improved light sensor to capture and process image data to improve dynamic range.

2. Background Art

Typical digital image capture systems such as digital cameras employ a sensor, memory and processor. Sensors are manufactured using charge coupled device (CCD) or complimentary metal oxides (CMOS) semiconductor processes. A typical CMOS sensor includes a pixel array having a plurality of pixel cells arranged in rows and columns. A correlated double sampler (CDS), an amplifier, and an analog-to-digital converter are also included for every column of the pixel array. In a typical system, light intensities captured in each pixel cell of the CMOS sensor are directly transferred to a respective CDS. Thereafter, the image data is provided to an amplifier for amplification. The amplified signal is provided to the analog-to-digital converter, which converts the analog signal into a digital signal. Once the image data is converted into digital form, it is often stored in a memory and/or transferred for further processing either locally within the image capture system or remotely within another image processing system, such as a computer.

An important component in the processing of the image data is to compress the data for easier transmission and/or storage. In the prior art approach, each pixel cell generates a pixel value that is first stored in memory. The stored pixel values are then manipulated and compressed by a digital signal processing (DSP) program executing on a processor.

As the size of the pixel arrays grows, the amount of local memory required to store the pixel values also increases correspondingly. For example, as the pixel array grows from 512×512 to 1024×1024 and assuming one byte per pixel, the minimal memory requirements increase from 262,144 bytes to 1,048,576 bytes for each image captured. Consequently, four times more memory is needed to store a picture.

An additional concern for video image data is the need to meet bandwidth requirements. As an array grows, additional bandwidth is needed to transfer the additional image data at a given frame rate to other image processing systems, such as computers.

As a pixel array grows from 512×512 to 1024×1024, the bandwidth required increases by approximately four times. For example, assuming 30 frames per second, the uncompressed data rate from a sensor 512×512 array with (1 byte) per pixel is approximately 7.8 megabytes per second for the 512×512 array. The data rate is increased to 31.5 megabytes per second for the 1024×1024 array.

To improve picture quality and to add color to a picture, typical image processing systems increase the number of bytes employed to represent each pixel. For color applications, each pixel is typically represented by more than one byte. For example, some color processing systems employ two bytes, or 16 bits, to represent a single pixel value. As each pixel is represented by a greater number of bytes, the memory requirements and bandwidth requirements increase accordingly.

In addition, for increased dynamic range in the image sensor, some current systems propose that additional memory elements be used to hold multiple readings of a single pixel such that two integration times are captured and analyzed. Consequently, it would be desirable to provide an improved sensor that would reduce the memory storage and bandwidth requirements for image capture and transmission.

SUMMARY OF THE INVENTION

In an image capture system having a sensor with a first node and a second node, a method of capturing image data is disclosed. The first node is reset. The second node is reset. An image is collected on the first node. A first pixel value is then transferred from the first node to the second node after a first predetermined time period. The first pixel value and a second pixel value is then provided after a second predetermined time period. An arithmetic operation is performed on the first pixel value and the second pixel value. A system for performing the method is also disclosed.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams. Depending upon the implementation, the corresponding apparatus element may be configured in hardware, software, firmware or combinations thereof.

Figure 1:
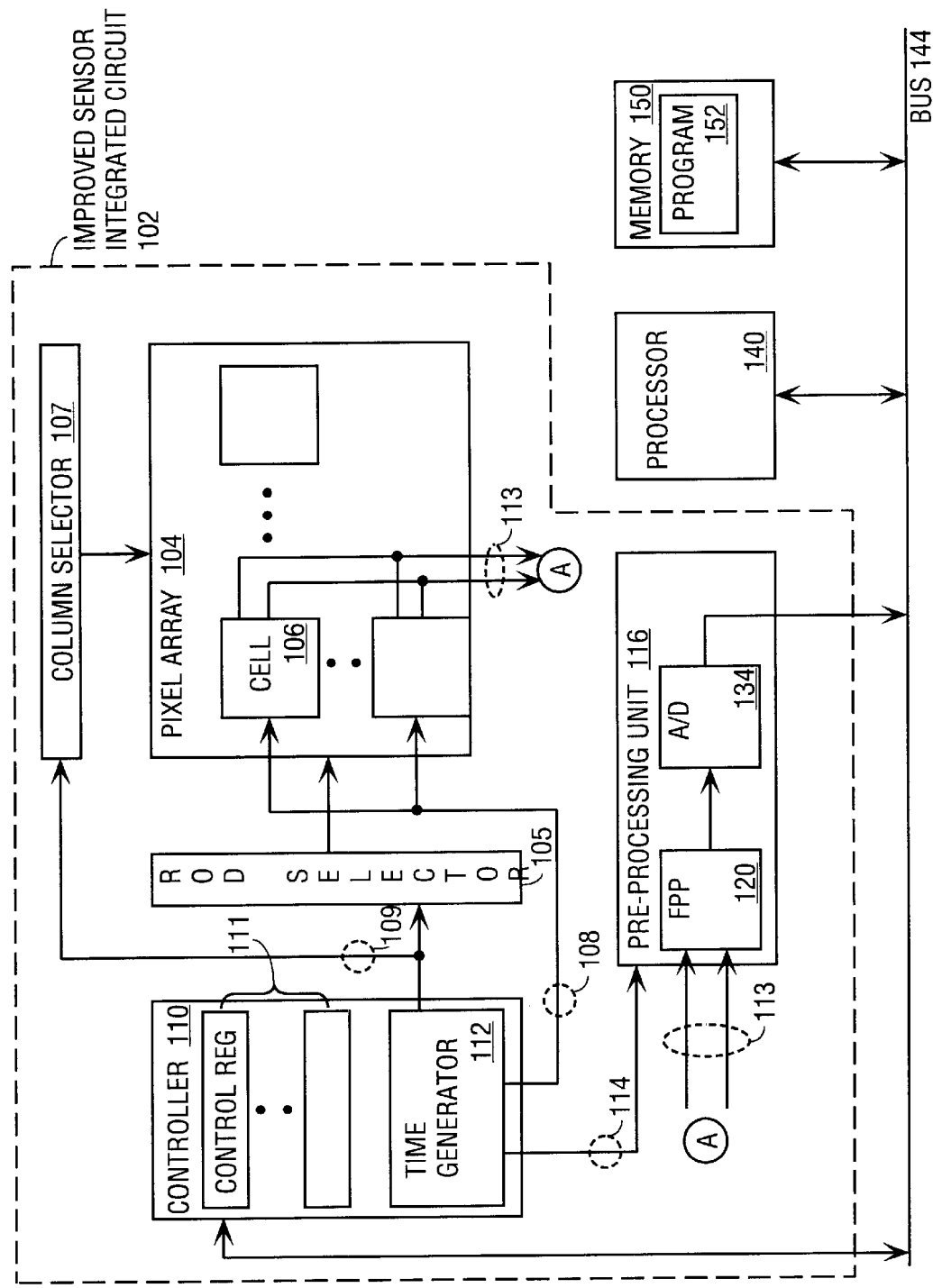
FIG. 1 illustrates an image capture system configured in accordance with the teachings of the present invention.

FIG. 1 illustrates an image capture system 100 in which an improved sensor 102 of the present invention may be implemented. The improved sensor 102 interacts. with a processor 140 and a memory 150 through a bus 144. In one embodiment of the present invention, the improved sensor 102 includes a pixel array 104 having a plurality of pixels, arranged in rows and columns. For example, the pixel array 104 may include 512×512 pixel cells or 1024×1024 pixel cells. Each pixel cell features an improved architecture having a temporary storage element, a first readout circuit, and a second readout circuit, which will be described in greater detail hereinafter with reference to FIG. 2.

A row selector 105 is provided to specify a particular row in the pixel array 104 based on control signals provided by the controller 110. A column selector 107 is provided to specify a column in the pixel array 104 based on control signals provided by the controller 110. The row selector 105 and the column selector 107 together specify a particular pixel cell within the pixel array 104.

The controller 110 includes one or more control registers 111 and a timing generator 112. The control registers 111 are accessible by the processor 140. For example, processor 140 may selectively read values from the registers 111 and write values into the control registers 111. The control registers 111, in turn, provide the value stored therein to the timing generator 112. The timing generator 112, based on the values provided by the control registers 111, selectively generates signals 109 to the row selector 105, the column selector 107, signals 108 to each cell in the pixel array 104, and signals 114 to a pre-processing unit 116.

The pre-processing unit 116 includes a focal plane processor 120 and an analog to digital converter 134. The focal plane processor 120 includes two inputs for receiving two pixel values 113 provided by the pixel array 104. The focal plane processor 120 performs an arithmetic or logical operation on the received values and generates a result. This result is provided to the A/D converter 134, which converts the analog result into a digital value. The digitized pixel value is then provided to bus 144 for storage or further processing. The signals 114 provided by the controller 110 to the pre-processing unit 116 specify the particular arithmetic or logical operation and also manages the timing of the processing and analog to digital conversion.

The pixel cell 106 includes an input for receiving a set of signals 108 from the controller 110 and output for providing pixel value signals 113 to the preprocessing unit 116. Control signals 108 may include, but are not limited to, RS1, RS2, Source, TX, IG, V1, and V2. These signals are described in greater detail hereinafter.

The timing generator 112 may include clock generation circuits and counters (not shown), which are known in the art. The control registers 111 may be loaded by an in system processor 140 or indirectly by a host processor (not shown). Once loaded, the registers 111 may provide the 1) starting values, 2) increment count, 3) stopping values and 4) other information needed in the operation and control of the sequencing of the control signals.

The memory 150 may include a program 152 for providing an interface between a user and the improved sensor 102. When executing on processor 140, the program 152 may query a user for particular inputs, such as image capture time, electronic shutter controls, gain controls, light levels and specific memory types.

In the embodiment where the improved sensor 102 is incorporated in a digital camera, the program 152 may be a simple lookup table that provides hard-wired inputs to the controller 110.

In the embodiment where the image capture system 100 is tethered to a host processor (not shown), the program 152 may include graphical user interfaces(GUIs) to allow a user to interact with the improved sensor 102.

The cell 106 is first selected by the row selector 105 and the column selector 107. The cell 106 includes an input for receiving the control signals 108 from the timing generator 112. In response to these control signals 108, the cell 106 generates two pixel values 113, which are provided to a pre-processing unit 116. The architecture of the improved cell 106 is described in greater detail with reference to FIG. 2. The two pixel values 113 that are provided to the pre-processing unit 116 are from successive frames. The cell 106 includes a storage element for storing a first pixel value, while a second pixel value, corresponding to a pixel value in the next frame, is captured. The steps performed by the improved sensor 102 in accordance with one embodiment of the present invention is set forth in greater detail with reference to FIG. 4.

It should be noted that any of cells in the pixel array 104 may be accessed in a similar fashion. In this embodiment, there is a pre-processing unit 116 associated with each column of the pixel array 104. The preprocessing units associated with the other columns of the pixel array 104 are not shown in this figure in order not to clutter the diagram.

It should be noted that, although in the preferred embodiment there is a pre-processing unit associated with each column of the pixel array 104, it is contemplated that two or more columns of the pixel array 104 may share a single pre-processing unit.

In yet another embodiment of the present invention, the pre-processing unit 116 may be integrated into each pixel cell.. In the preferred embodiment, the focal plane processor 120 may be implemented with an Arithmetic Logic Unit (ALU).

In alternative embodiments, the focal plane processor may be integrated as part of each pixel cell. Although the improved sensor 102 has been described as having a pre-processing unit 120 for each column of the pixel array 104, it will be understood that other architectures are more suitable for different applications. For example, a single pre-processing unit may receive data from two adjacent columns. In this architecture, the single pre-processing unit may compare the values of adjacent columns. Since each pixel cell includes two outputs, each pre-processing unit may receive one output from a first column and a second output from an adjacent column.

In alternative embodiments, the focal plane processor may be implemented by differencing circuits, time averaging or spatial averaging circuits. The focal plane processor may also be a compensation circuit with feedback to alter the gain of the pixel drivers, or to modify the capture characteristics of the pixel. Focal plane processor may alter the pixel data by employing the surrounding pixels or the characteristics of a single pixel. For example, the value of a pixel may be changed depending on the values of the surrounding pixels if it is so determined there needs to be compensation for the pixel.

As noted previously, memory 150 is provided to store data and one or more programs for interfacing with the improved sensor of the present invention. Furthermore, memory 150 may include programs for performing further digital signal processing (DSP) on pixel data or image data. Processor 140 may be a microcontroller, such as an MC251 manufactured by the assignee of the present invention. The processor 140, under the direction of a DSP program, may perform local DSP functions.

If the digital processing of the image is deferred until the data is transferred to a personal computer (PC), the image processing program may be executed on the host processor (not shown) of the PC. The host processor may be a Pentium® processor with MMX™ technology sold by the assignee of the present invention.

Figure 2:
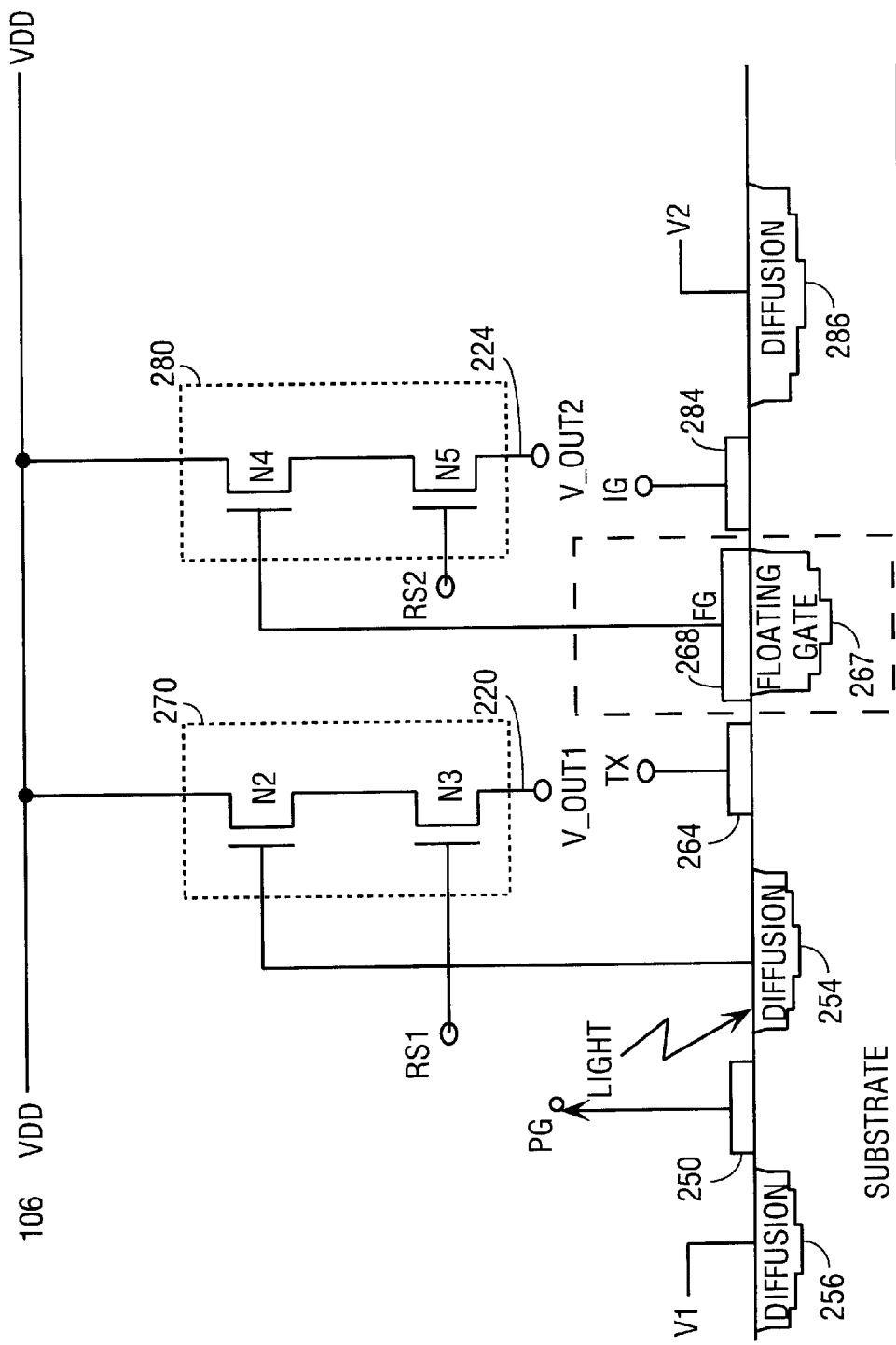
FIG. 2 illustrates the improved pixel cell configured in accordance with the teachings of the present invention.

FIG. 2 illustrates the improved pixel cell 106 configured in accordance with the teachings of one embodiment of the present invention. Each pixel cell 106 includes a first input for receiving a first reset signal (hereinafter referred to as the "PG signal"), a second input for receiving a second reset signal (hereinafter referred to as the "IG signal"), a third input for receiving a transfer signal (hereinafter referred to as the "TX signal"), a fourth input for receiving a first readout signal (hereinafter referred to as the "RS1 signal"), and a fifth input for receiving a second readout signal (hereinafter referred to as the "RS2 signal").

Each pixel cell 106 includes a first node 254 for collecting light and a second node 267 that acts as a temporary storage element. Each pixel cell 102 also includes a third node 220 for providing a pixel value (hereinafter referred to as the "V_OUT1 signal") and a fourth node 224 for providing another pixel value (hereinafter referred to as the "V_OUT2 signal").

As will be described in further detail with reference to FIG. 4, a controller that controls the sensor employs the first reset signal and the second reset signal to reset the first node and second node, respectively. Moreover, the controller employs the transfer signal to transfer data between the first and second nodes. Two captures are performed at the same time on the same pixel, with one capture having a longer integration time than the other. The controller employs the first readout signal to readout a pixel value from the first node and the second readout signal to readout another pixel value from the second node. For the sake of clarity, Table I is provided that sets forth the signal names and the corresponding signal descriptions for one embodiment of the present invention.

TABLE I

| Signal | Description |
| --- | --- |
| PG | First reset signal employed to reset the first node |
| IG | Second reset signal employed to reset the second node |
| TX | Transfer signal employed to transfer a pixel value from the first node to the second node |
| RS1 | First readout signal employed to read the first node |
| RS2 | Second readout signal employed to read the second node |
| V_OUT1 | First pixel value corresponding to the first node |
| V_OUT2 | Second pixel value corresponding to the second node |

The pixel cell 106 is also provided with the following power voltages ($V_{DD}$, V1 and V2). In the preferred embodiment, VDD is approximately equal to 3.3V, and V1 and V2 are approximately equal to zero volts.

The pixel cell 106 also includes a first readout circuit 270 and a second readout circuit 280. In response to the control signals RS1 and RS2, the first readout circuit 270 and the second readout circuit 280 selectively provide the V_OUT1 signal and the V_OUT2 signal at the third node 220 and fourth node 224, respectively.

Figure 3:
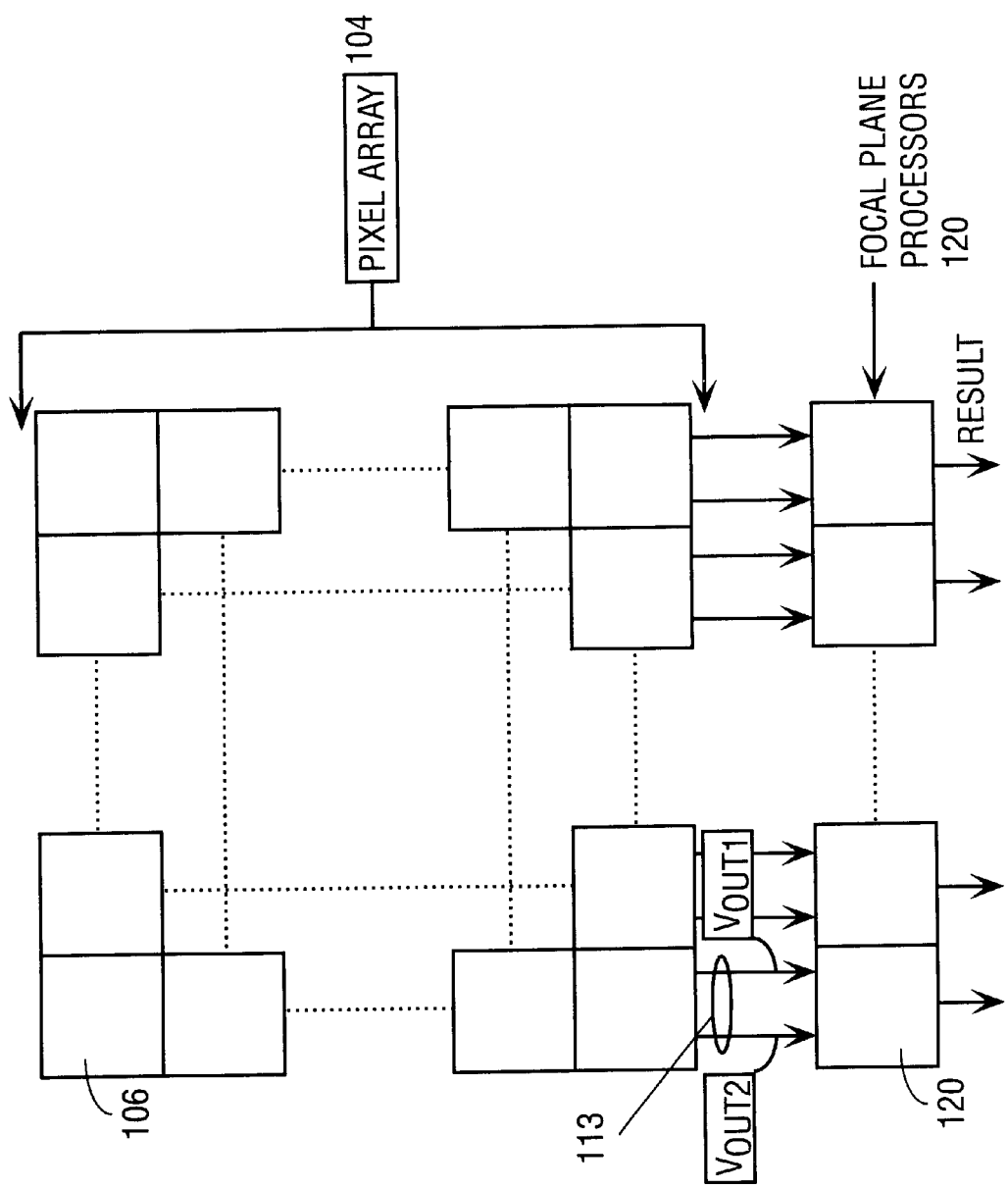
FIG. 3 is a simplified block diagram illustrating the pixel array and the focal plane processors of the improved sensor of the present invention.

FIG. 3 is a simplified block diagram illustrating a pixel array 104 employing the pixel cells 106 and the focal plane processors 120 of the present invention. The pixel array 104 includes a plurality of pixel cells arranged in rows and columns. For each column, there is a first conductor for providing the V_OUT1 signal and a second conductor for providing the V_OUT2 signal (i.e. a pair of conductors 113). There is a focal plane processor 120 for each column. Similarly, there is an interface circuit (not shown) for each column.

Figure 4:
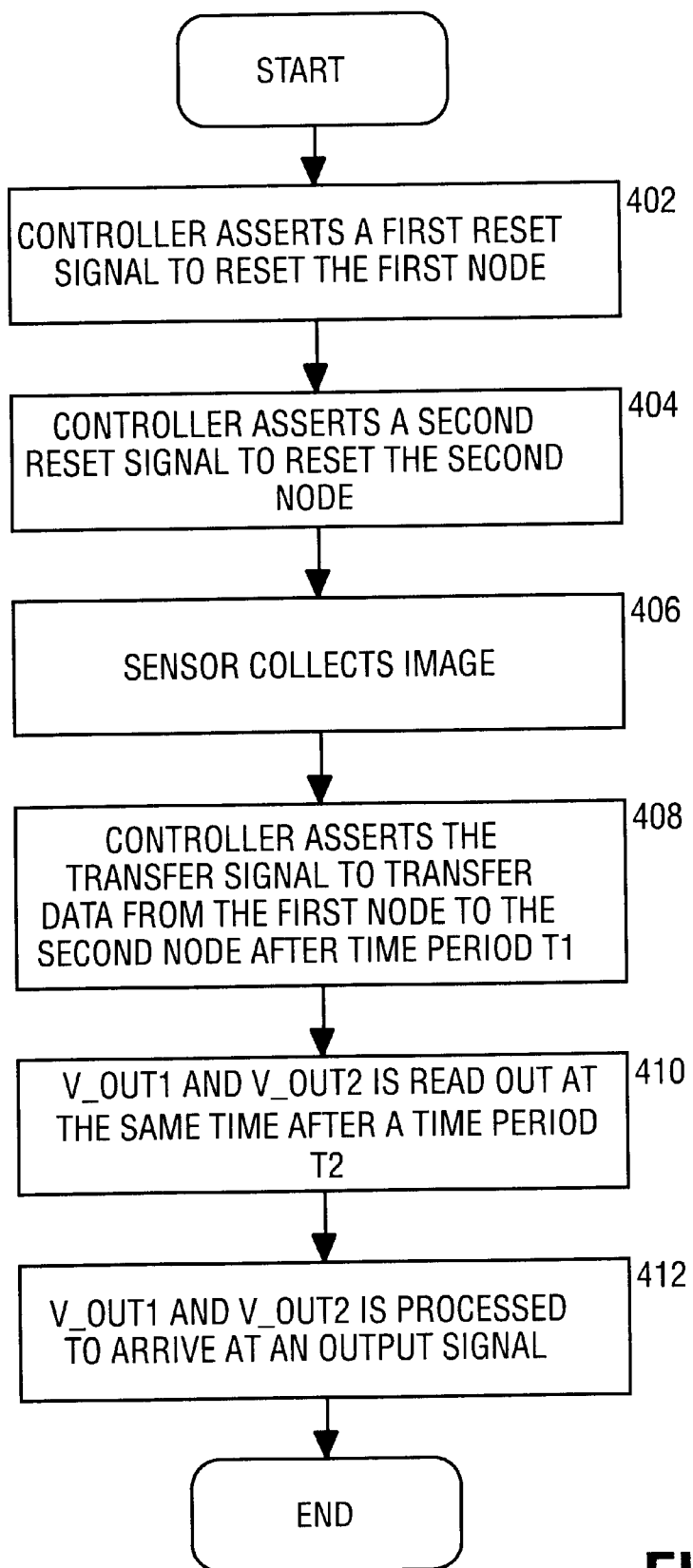
FIG. 4 is a flowchart illustrating how a signal processing program may employ the improved sensor to capture and process image data in accordance with one embodiment of the present invention.

FIG. 4 is a flowchart illustrating how a signal processing program may employ the improved sensor to capture and process image data in accordance with one embodiment of the present invention. In step 402, the controller asserts the first reset signal (PG) to reset node 254 by device 250 and diffusion 256 to a predetermined voltage (e.g., approximately 0V). In step 404, the controller asserts the second reset signal (IG) to reset node 267 by device 284 and node 286 to the predetermined voltage. In step 406, an image is collected on node 254.

In step 408, the controller asserts the transfer signal (TX) to transfer the pixel value on node 254 to node 267 by employing device 264 at a time period T1. After this transfer, node 267 contains the value corresponding to a pixel capture with an integration time period of T1. In step 410, after an additional time period of T2, node 254 will be at another value due to further integration of an additional time period of T2. The controller asserts the first readout signal (RS1) to read node 254 through a first readout circuit 270. A pixel value (V_OUT1) on node 254 is provided to the third node 220. In addition, the controller asserts the second readout signal (RS2) to read node 267 (containing a pixel value) through the second readout circuit 280. A pixel value (V_OUT2) on node 267 is provided to the fourth node 224. Thus, V_OUT1 and V_OUT2 is output at a time period T1+T2.

In step 412, V_OUT1 and V_OUT2 are processed to arrive at a final output signal representing a pixel capture with a greater dynamic range. For example, V_OUT1 and V_OUT2 can be ratioed or have different gain curves applied to them. In this embodiment, processing step 412 determines a weighted average between V_OUT1 and V_OUT2 using pre-processing unit 116. Depending on the application, other operations such as a statistical value generation may be preferred or needed.

The operation of the pixel cell, the focal plane processor, and the interface circuit may be affected by user inputs. These user inputs may include, but are not limited to, picture size (e.g., a wide angle picture or a close-up picture), light levels, exposure time, selected compression algorithm (e.g., an amount of lossiness allowed for in the compression), and the use of flash in taking the picture.

The user inputs that are most influential in the present invention are 1) the amount of compression, and 2) the type of compression. As the amount of compression increases, the compressed signal loses picture information. Moreover, a longer time is needed to perform the compression. The processing time involved to perform the compression may affect a system designer's decision whether to integrate a signal processing circuit with the pixel cell or to employ a circuit external to the pixel cell, to perform the compression outside of each pixel cell.

These user inputs may also affect how much dynamic range compensation is used in the system. Once a user specifies these factors, a host processor or microcontroller, executing firmware or software, generates appropriate control signals and timing signals based on these factors.

Figure 5:
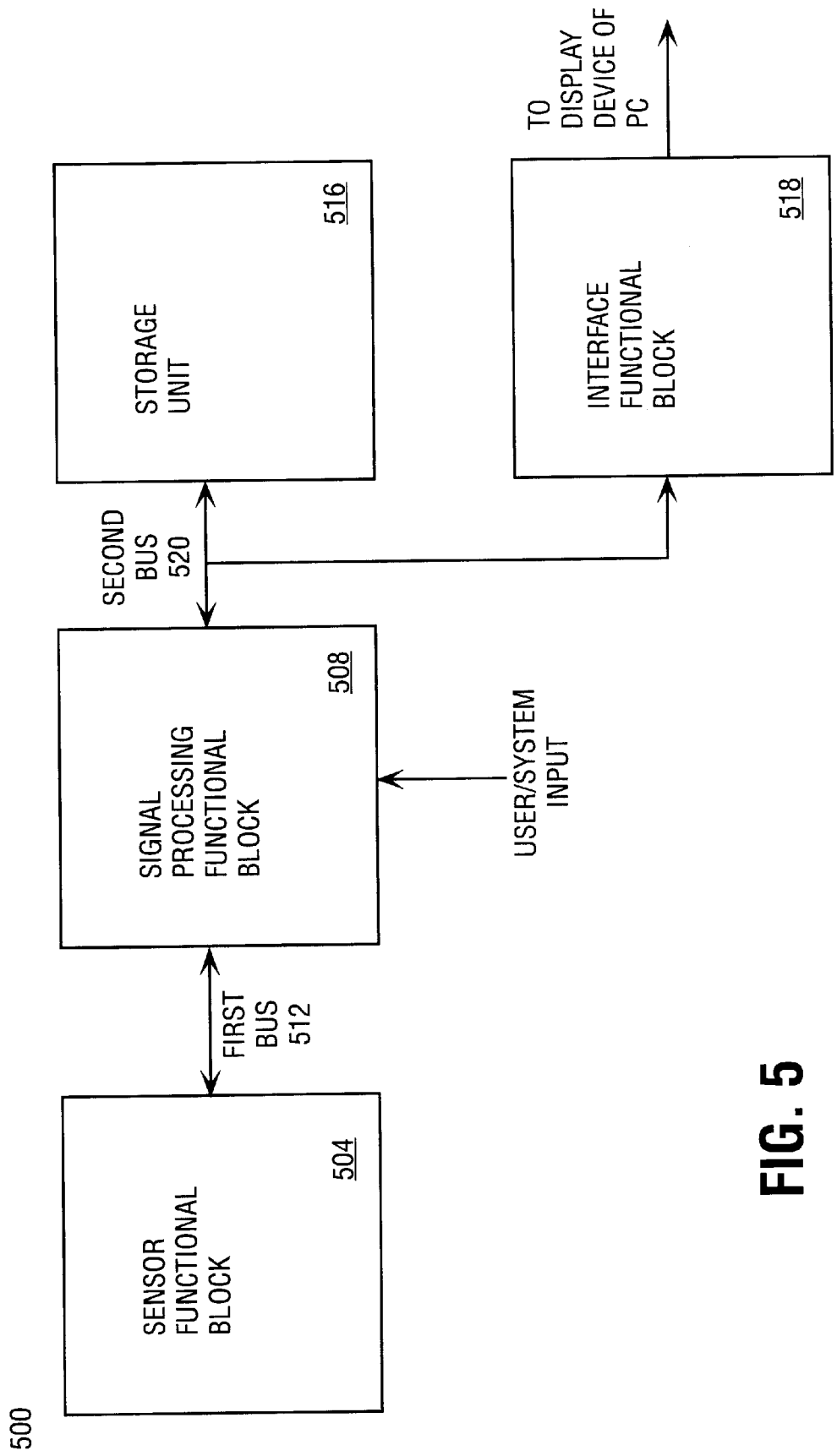
FIG. 5 is a block diagram of an image capture device (e.g., a digital camera) in which the improved sensor of the present invention may be implemented

FIG. 5 is a block diagram of an image capture device 500 (e.g., a digital camera) in which the improved sensor 504 (hereinafter referred to as a sensor functional block (SFB)) of the present invention may be implemented. The sensor functional block (SFB) 504 may include the improved sensor 102, the focal plane processor 120, and interface circuit described above. The SFB 504 is coupled to a digital signal processing functional block (SPFB) 508 via a first bus 512. Data and control signals are communicated between the SFB 504 and the SPFB 508 through the first bus 512. The SPFB 508 also includes an input for user input. The user input may include an aperture setting, a shutter speed setting, and a desired resolution setting.

The information may be transferred between SPFB 508 and SFB 504 through a serial or parallel bus. The control signals for this bus are the typical read/write signals, data signals and clock signal. The sensor 504 includes a plurality of registers that store and provide control signals, timing signals and start/stop signals for the sensor 504. These functions may include integration time, and information to specify which rows and columns to read. Other signals include a start/stop signal for controlling the transfer of data from the sensor to the host processor or memory. This start/stop signal may act as an interrupt signal to suspend the operation of the sensor for short periods of tine. Other signals may include outputs provided by the sensor to indicate end-of-frame, end-of-line, and the start-of-frame.

The SPFB 508 also includes an input for receiving user inputs as described previously. Depending on camera model and complexity of the camera, set exposure time, window size, and aperture. In general, these are inputs that are selected by a switch or multi-push button that the microcontroller may "read". The SPFB then turns these user inputs into a code that it writes via the 512 bus to specific register in the sensor.

Although in the preferred embodiment, the sensor functional block 504 is implemented by employing complementary metal oxide semiconductor technology (CMOS), it will be understood by those skilled in the art that the SFB 504 may be implemented using standard CCD processes. The principal difference between a sensor functional block 504 implemented using a CCD process, as opposed to a CMOS process, is that the sensor functional block 504 implemented with a CCD process, generates an analog input, whereas the sensor functional block 504, implemented as in a CMOS process, includes analog to digital converters. Consequently, a signal functional block 504, implemented with a CMOS process, generates a digital image output.

A storage unit 516 is coupled to the SPFB 508 via a second bus 520. The storage unit 516 may be an embedded memory unit (e.g., FLASH memory) or any of the removable memory unit (e.g., Miniature Card). The removable memory unit may be employed to transfer data from image capture device to the PC for further processing, provided that the PC is equipped with the appropriate receptacles for the removable memory unit. As an example, with a PC Card adapter, image files on a Miniature Card may be transferred to any laptop or desktop PC that has a PC Card slot and the image data may then be viewed, edited, enhanced, or otherwise processed on the PC or be transmitted from the PC over a computer network to other devices connected to the network for printing, sharing, or other appropriate processing.

An interface functional block 518 is also coupled to the SPFB 508 via the second bus 520. The interface functional block 518 translates the data in a second bus format into a format acceptable to a display device (e.g., NTSC format or monitor format, or still image format) or to a personal computer (PC) via serial bus (e.g., USB protocol and/or RS-232 protocol).

Figure 6:
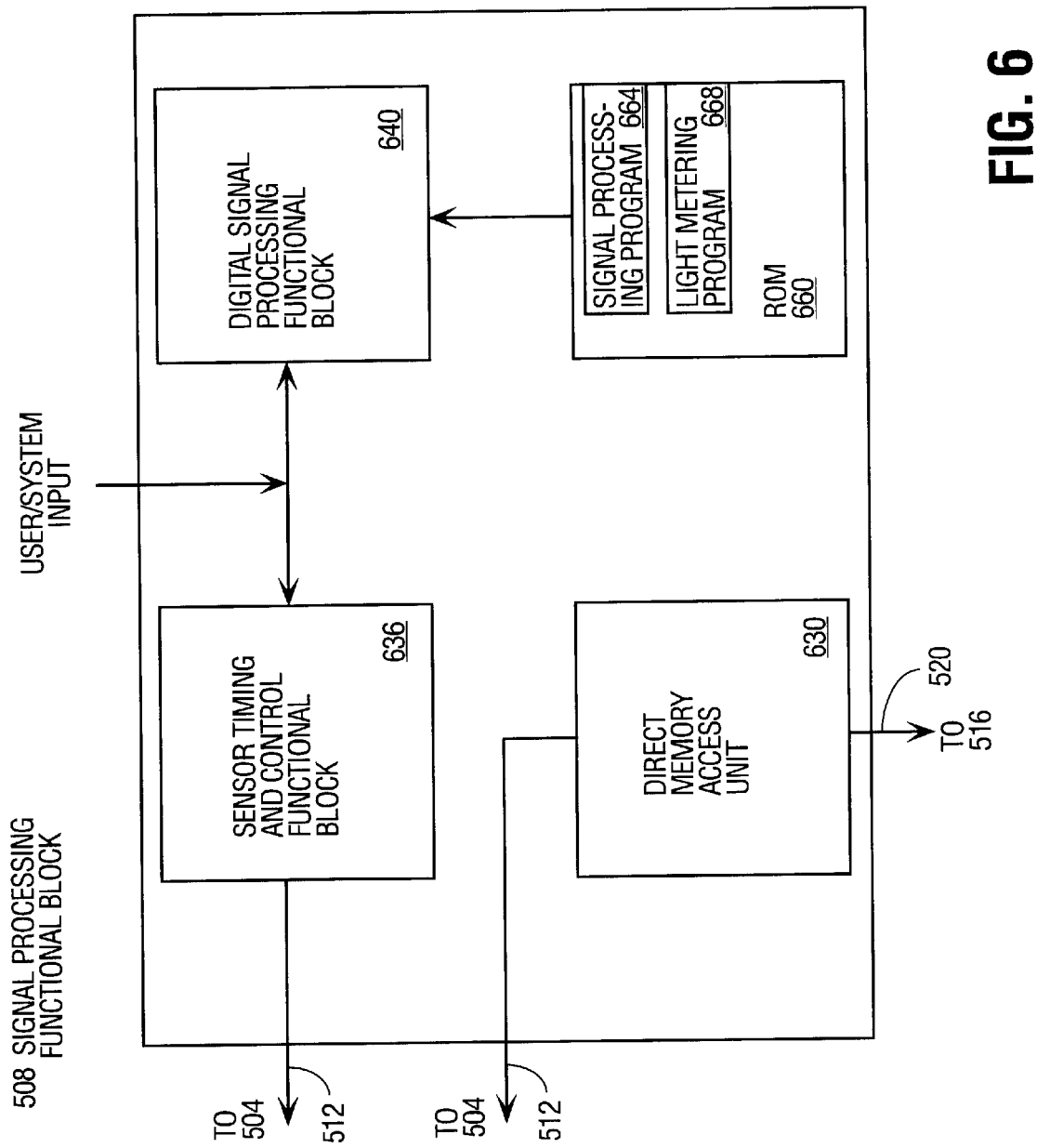
FIG. 6 is a block diagram illustrating in greater detail the digital signal processing functional block of FIG. 5.

FIG. 6 is a block diagram illustrating in greater detail one embodiment of the SPFB 508 of FIG. 5. The SPFB 508 includes a sensor timing and control functional block 636 that is coupled to the SFB 504 via the first bus 512. The sensor timing and control functional block 636 generate timing and control signals. The sensor timing and control functional block 636 may be implemented with a custom gate array or a programmable logic array (PLA) or any other suitable integrated circuits.

A direct memory access unit (DMA) 650 is coupled to the first bus 512 and the second bus 520 and buffers and transfers data between the SFB 504 to the storage unit 516 and the interface functional block 518. The DMA unit 650 is well-known in the art and will not be described herein.

The SPFB 508 also includes a digital signal processing (DSP) functional block 640. In the preferred embodiment, the DSP functional block 640 is coupled to the first bus 504. In alternative embodiments, the DSP functional block 640 is coupled to the second bus 520 or to sensor timing and control functional block 636 and the read only memory 660. It will be understood that the general architecture described in FIGS. 5 and 6 may be modified to suit a particular application or optimize a specific camera system implementation.

The DSP functional block 640 is configured to perform specific signal processing operations such as noise removal, compression and other signal processing operations.

A memory or storage unit 660 such as a read only memory (ROM) is coupled to the DSP functional block 640. The unit 660 may store specific instructions such as a signal processing program 664 and a light metering program 668.

The DSP functional block 640 may be implemented by a custom application specific integrated circuit (ASIC), a custom gate array, or a microcontroller having specific DSP hardware configured around the microcontroller, or any other suitable integrated circuits. For a microcontroller-based approach, an Intel 80296 or 80X296 microcontroller may be employed.

Although FIG. 6 illustrates the memory or storage unit 660 as a separate component from the DSP functional block 640, it will be known by those skilled in the art that the unit 660 and the associated programs (e.g., image compression schemes) may be embedded in the DSP functional block 640. For example, the ROM and associated programs may be embedded in a microcontroller that is used to implement the DSP functional block 640.

Figure 7:
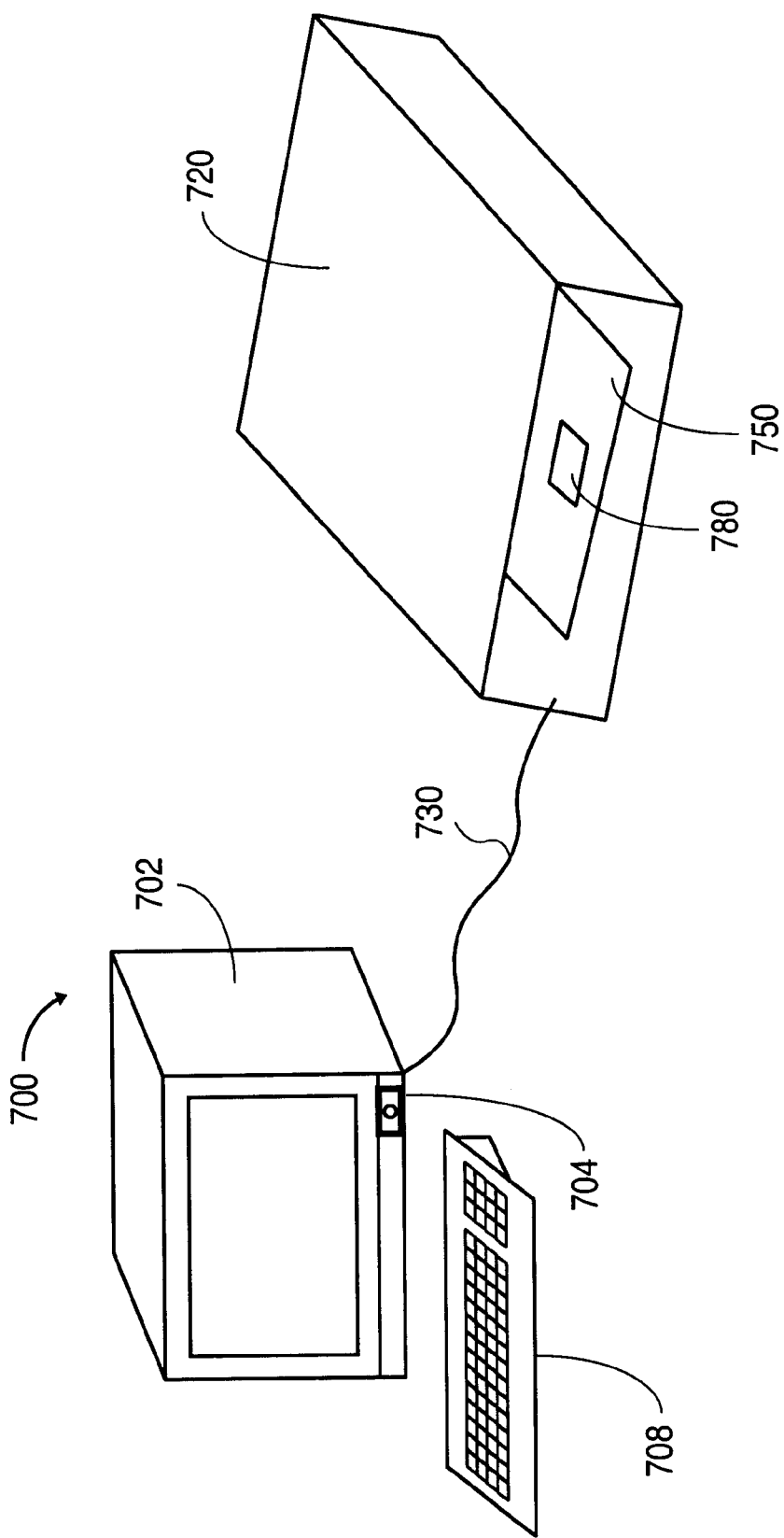
FIG. 7 illustrates a computer system having a silicon eye in which the improved sensor of the present invention may be implemented.

FIG. 7 illustrates a computer system having a silicon eye in which the improved sensor of the present invention may be implemented. The computer system 700 includes a display device 702 having a silicon eye 704. The computer system 700 may also optionally include a keyboard 708, a microphone (not shown), a mouse (not shown), or any other appropriate input devices for receiving user input. The silicon eye 704 is coupled to the personal computer (PC) 720 via appropriate connecting devices such a serial cable 730, or an inferred connector (not shown). The serial cable 730 may be coupled to the PC 720 via a serial port conforming to a serial port standard (such as RS232 or USB). The inferred connection may be implemented in accordance with methods well known in the art. As will be described in greater detail in FIG. 8, the image signal is then stored and processed by the microprocessor 780, disposed on a motherboard 750.

Figure 8:
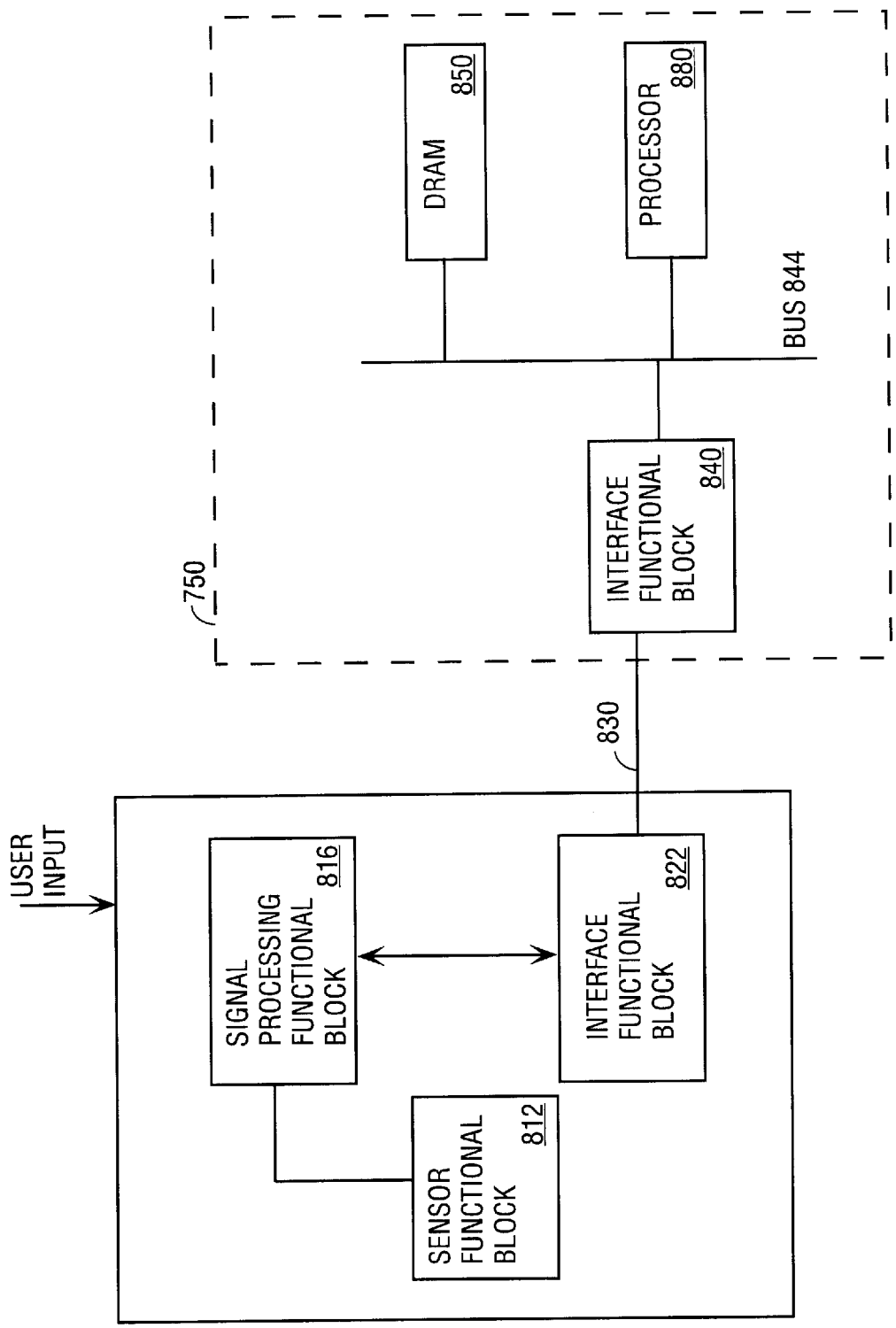
FIG. 8 is a block diagram illustrating in greater detail the computer system, shown in FIG. 7.

FIG. 8 is a block diagram illustrating in greater detail the computer system, shown in FIG. 7. In a computer system having the silicon eye, the SPFB 816 and the interface functional block 822 are integrated with the sensor functional block 812 to comprise elements of the silicon eye 804. The silicon eye 804 also includes optics (not shown) for receiving light, an input for receiving user input, and includes an output for generating the digital image in a serial format through an appropriate connecting device such as a serial cable 830, or an inferred connector.

On the motherboard 750, an optional interface functional block 840 may be provided to translate the image information from one format into another and/or to further conform the image to a protocol supported by a bus 844.

The storage unit 516, illustrated in the digital image capture device of FIG. 5, is not needed in this embodiment since memory 850 of the computer system may be employed to store the image. The memory 850 may be dynamic random access memory (DRAM), a hard drive, or any other appropriate storage device in a computer system.

In this embodiment a processor 880 of the computer system may be employed to perform the signal processing and/or any light metering processing needed. The processor 880 may be a Pentium® processor with MMX™ technology sold by the assignee of the present invention.

Moreover, the memory 850 may store the signal processing program 664 and the light metering processing program 668 that was stored in the ROM in an image capture device (See FIG. 6). The memory 850, the processor 880, and the interface functional block 840 communicate with each other through a bus 844.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. In an image capture system having a sensor, the sensor having a plurality of pixel cells each having a first node and a second node and a third node and a fourth node, a method of capturing image data from a selected pixel cell, comprising:
   performing two captures at the same time on the selected pixel cell with one capture having a longer integration time period than another, by
   a) resetting the second node of the selected pixel cell;
   b) resetting the first node of the selected pixel cell; and then
   c) collecting an image on the first node of the selected pixel cell; and then
   d) transferring a first pixel value from the first node to the second node after a first predetermined nonzero time period being the integration time period of one capture during which the image is collected on the first node but not the second node; and then
   e) reading a second pixel value from the first node via the third node of the selected pixel cell, and reading the first pixel value from the second node via the fourth node of the selected pixel cell, after a second predetermined nonzero time period that follows the first time period and during which the image is collected on the first node, a sum of the first and second time periods being the longer integration time period of another capture; and
   f) performing an arithmetic operation on the first pixel value and the second pixel value to generate a result; and
   g) providing the result as a value of the selected pixel cell, to the image capture system.

2. The method of claim 1 wherein performing an arithmetic operation on the first pixel value and the second pixel value includes determining a weighted average between the first pixel value and the second pixel value.

3. The method of claim 1, wherein providing the result to the image capture system includes performing an analog-to-digital conversion on the result.

4. The method of claim 1, wherein performing an arithmetic operation on the first pixel value and the second pixel value includes performing an analog-to-digital conversion on the first pixel value and the second pixel value before the arithmetic operation is performed.

5. The method of claim 1, wherein the first node and the second node are substantially segregated electronically other than when transferring the first pixel value.

6. In an image capture system having a sensor and a controller for controlling the sensor, the sensor including a pixel array having a plurality of pixel cells arranged in rows and columns, each pixel cell having a first node for collecting an image, a second node, a third node and a fourth node, a focal plane processor for processing a first pixel value and a second pixel value, a method of capturing image data from a selected pixel cell, comprising:
   performing two captures at the same time on the selected pixel cell with one capture having a longer integration time period than another, by
   a) the controller asserting a second reset signal to reset the second node to a predetermined value;
   b) the controller asserting a first reset signal to reset the first node to a predetermined value; and then
   c) the pixel cell collecting an image on the first node represented by the first pixel value, and not on the second node; and then
   d) the controller asserting a first transfer signal to transfer the first pixel value from the first node to be stored at the second node after a first predetermined time period being the integration time period of one capture during which the image is collected on the first node; and then
   e) the controller asserting a first readout signal to read the second pixel value from the first node via the third node and to provide a second readout signal to read the first pixel value stored at the second node via the fourth node, after a second predetermined time period that follows the first time period and during which the image is collected on the first node, a sum of the first and second time periods being the longer integration time period of another capture; and then
   f) the focal plane processor performing an arithmetic operation on the first pixel value and the second pixel value to generate a result; and then
   g) the focal plane processor providing the result, as a value of the selected pixel, to the image capture system.

7. The method of claim 6 wherein the focal plane processor performing an arithmetic operation includes determining a weighted average between the first pixel value and the second pixel value.

8. The method of claim 6, wherein the focal plane processor providing the result to the image capture system includes the focal plane processor performing an analog-to-digital conversion on the result.

9. The method of claim 6 wherein the predetermined value is approximately 0 volts.

10. The method of claim 7, wherein the focal plane processor performing an arithmetic operation on the first pixel value and the second pixel value includes the focal plane processor performing an analog-to-digital conversion on the first pixel value and the second pixel value before the arithmetic operation is performed.

11. The method of claim 6, wherein the controller keeps the first node and the second node substantially segregated electronically other than when the first transfer signal is asserted.

12. An image capture system comprising:
a) a sensor for capturing image data having
   i) a pixel array having a plurality of pixel cells arranged in rows and columns, each pixel cell having a first node for collecting image data, a second node, a third node, and a fourth node;
   ii) a first data conductor, coupled to the third node for communicating a first pixel value from each of a group of pixel cells in one of a row and a column of the array;
   iii) a second data conductor, coupled to the fourth node for communicating a second pixel value from each of the group of pixel cells;
   iv) a focal plane processor coupled to the first data conductor and the second data conductor for receiving the first pixel value and the second pixel value, respectively, and responsive thereto performing an arithmetic operation on the first pixel value and the second pixel value to generate a result, the focal plane processor having an output for providing the result;
   v) an interface circuit, coupled to the output of each focal plane processor, for interfacing the focal plane processor to a bus; and
b) a controller, coupled to the sensor, for controlling the sensor for managing the transfer of data from the pixel cell to the focal plane processor, for controlling the focal plane processor, for managing the transfer of data from the focal plane processor to the interface circuit, for controlling the interface circuit and for managing the transfer of data to the bus;
wherein the controller controls the sensor to generate a value representing the image detected by a selected pixel cell by performing two captures at the same time on the selected pixel cell with one capture having a longer integration time period than another to yield the first and second pixel values having different, nonzero integration times, the first and second pixel values being obtained by the first node of the selected pixel, the second pixel value being stored at the second node prior to being transferred to the fourth node.

13. The image capture system of claim 12 wherein the controller is a microcontroller.

14. The image capture system of claim 12 wherein the focal plane processor includes a weighted average circuit.

15. The image capture system of claim 12 wherein each pixel cell includes a first readout circuit for providing the first pixel value and a second readout circuit for providing the second pixel value.

16. The image capture system of claim 15 wherein the interface circuit includes a correlated double sampler.

17. The image capture system of claim 16 wherein the interface circuit further includes an amplifier coupled to the correlated double sampler for providing gain to the output of the correlated double sampler.

18. The image capture system of claim 17 wherein the interface circuit further includes an analog-to-digital converter coupled to the amplifier for converting the analog output of the amplifier to a digital value suitable for transmission on the bus.

19. The method of claim 3 wherein the first and second pixel values are read simultaneously at the end of the second time period.

20. The method of claim 6 wherein the first and second pixel values are read simultaneously at the end of the second time period.

21. The image capture system of claim 12 wherein the sensor has been implemented by a complimentary metal oxide semiconductor (CMOS) integrated circuit fabrication process.

22. The image capture system of claim 15 wherein in each pixel cell, the first and second readout circuits are to receive separate readout signals that control the transfer of data from the pixel cell to the focal plane processor.

23. The image capture system of claim 22 wherein each of the first and second readout circuits includes a source follower in series with a switch that is controlled by one of the separate readout signals.

24. The image capture system of claim 23 wherein each pixel cell has a photodiode that defines the first node and is coupled to provide a charge signal to an input of the source follower.

25. The image capture system of claim 22 wherein the first readout circuit is coupled between the third node and the first node, and the second readout circuit is coupled between the fourth node and the second node.

26. The image capture system of claim 22 wherein the sensor is part of a silicon eye that includes optics and that can communicate image data, captured by the sensor, over a computer peripheral bus with which the silicon eye can interface.

27. The image capture system of claim 26 wherein the silicon eye is attached to a display device and can receive sensor control parameters, including one that represents electronic shutter speed for the sensor, over the peripheral bus.

28. The image capture system of claim 26 wherein the silicon eye is part of a portable digital camera that includes a removable memory card to store the image data captured by the sensor.

* * * * *